United States Patent [19]

Dunning et al.

[11] Patent Number: 4,487,886

[45] Date of Patent: Dec. 11, 1984

[54] PROCESS FOR THE PRODUCTION OF AN OBJECT FROM AN ABS-POLYMER COMPOSITION

[75] Inventors: Leslie G. W. Dunning, Heythuysen; Jean P. L. M. N. de Warrimont, Geulle, both of Netherlands

[73] Assignee: Stamicarbon B.V., Licensing Subsidiary of DSM, Geleen, Netherlands

[21] Appl. No.: 544,730

[22] Filed: Oct. 24, 1983

Related U.S. Application Data

[63] Continuation-in-part of Ser. No. 397,872, Jul. 13, 1982, abandoned, which is a continuation of Ser. No. 302,084, Sep. 14, 1981, abandoned.

[30] Foreign Application Priority Data

Sep. 16, 1980 [NL] Netherlands ................. 8005166

[51] Int. Cl.$^3$ .............. C08L 51/04; C08L 55/02
[52] U.S. Cl. .................... 525/86; 264/331.13; 524/229; 524/303; 524/413; 524/504; 525/70; 525/75; 525/76; 525/83; 525/85
[58] Field of Search ............ 525/86, 85, 70, 75, 525/76, 83; 264/331.13; 524/504, 303, 413, 229

[56] References Cited

U.S. PATENT DOCUMENTS 3,793,403  2/1974  Dalton et al. .................... 525/68

FOREIGN PATENT DOCUMENTS 0048058  3/1982  European Pat. Off. .

Primary Examiner—Jacob Ziegler
Attorney, Agent, or Firm—Cushman, Darby & Cushman

[57] ABSTRACT

The invention relates to a process for the production of an object from a granular ABS polymer composition, said composition comprising a mixture of I  10–98 parts by weight of one or more graft copolymers obtained by polymerizing a mixture of one or more unsaturated nitriles and one or more vinylaromatic compounds in the presence of a rubber.

II  2–90 parts by weight of a copolymer of one or more unsaturated nitriles and one or more vinylaromatic compounds, and III  0–20 parts by weight of one or more additives, wherein the polymer composition is melted, homogenized, and extruded or injection molded into an object.

To improve the flow properties of the mixture introduced into the processing equipment and the throughput of this equipment the invention is characterized in that the ratio between the average particle size (by weight) of the copolymer II to the average particle size (by weight) of the graft copolymer I exceeds 1.5.

4 Claims, No Drawings

PROCESS FOR THE PRODUCTION OF AN OBJECT FROM AN ABS-POLYMER COMPOSITION

This application is a continuation in part of application Ser. No. 397,872 filed July 13, 1982, now abandoned, which is a continuation of application Ser. No. 302,084 filed Sept. 14, 1981, now abandoned.

The invention relates to a process for the production of a molded or extruded object from a combined granular composition containing ABS polymer, said composition comprising a mixture of I from 10 to 98 parts by weight, preferably 50 to 80 parts by weight, of at least one granular graft copolymer obtained by polymerizing a mixture of one or more unsaturated nitriles and one or more vinylaromatic compounds in the presence of a rubber of the class of polybutadiene, butadiene-styrene rubber, butadiene-acrylonitrile rubber, acrylate rubber, ethylene-propylene or ethylene-propylene-diene rubber, ethylene-vinylacetate, and chloroprene rubber, with II from 2 to 90 parts by weight, preferably 20 to 50 parts by weight, of a granular copolymer of at least one saturated nitrile and one or more vinylaromatic compounds, and with III from 0 to 20 parts by weight of at least one granular additive of the class of antioxidants, UV-stabilizers, lubricants, fillers, antistatics, flame retardants, and foaming agents.

For a great many objects such as piping for drainage, water supply, air heating and the like, metal is being replaced to an increasing extent by plastics. A type of plastic very widely used for piping, especially for sewer piping, is polyvinylchloride (PVC). For a number of pipe uses, it is impossible, however, to use PVC, because either the strength or the heat resistance is insufficient.

In the automotive industry, this replacement is also desirable to an increasing extent especially because the cost and the weight advantage of the plastic are important.

ABS is a type of plastic widely used in the automotive industry when PVC either lacks strength or heat resistance. With ABS, high standards in respect of impact resistance, rigidity, heat resistance and color consistency can be imposed.

ABS is essentially a graft copolymer obtained by polymerizing a mixture of styrene and acrylonitrile in the presence of a rubber, such as polybutadiene, SBR and the like. Usually the ABS graft polymer composition also contains a quantity of a copolymer of styrene and acrylonitrile (SAN), which has been prepared separately.

It is customary in the preparation of such ABS-polymer compositions for the producer of the composition first to mix all components, such as graft copolymer(s), copolymer(s), additives and pigment, and then to homogenize and granulate the final composition.

This granulate will then be melted by the processor and be processed to form molded products by means of extrusion or injection molding.

In principle such an ABS polymer composition is hardly ever processed into molded objects directly from its constituent parts.

There are two important reasons for it. The first is that objects made from an ABS-polymer composition must always comply with very stringent color and mechanical property specifications, so that every lot is specially made to order.

The second reason is that for the processing of ABS into molded objects which meet the required high standards in respect of the surface and of other properties, special equipment is required in connection with the mixing of the various components and to achieve the homogenity of the product.

Moreover, the feeding of the components of the polymer composition to the extruder or the injection molding equipment requires special provisions.

In U.S. Pat. No. 3,851,014 a process for mixing of ABS-crumb with a melt of a styrene-acrylonitrile copolymer is described. U.S. Pat. No. 3,694,402 is directed to mixing a granulate of a thermoplastic polymer with coated granules of an additive. GB Pat. No. 1,165,488 concerns the mixing of an ABS-carbonblack masterbatch with the same or another ABS.

It is an object of the invention to provide a process for the production of an object or article from an ABS-polymer composition by which the usual, stringent specifications are achieved, without using the above-described pre-prepared homogenized granulate, but instead using the separate components comprising the polymer composition.

It is a further object of the invention to provide a process wherein the flow properties of the mixture introduced into the feed of the extruder or injection molding equipment is improved.

It is a still further object of the invention to provide a process in which the throughput of the extruder or injection molding equipment is increased over the conventional processes.

These and further objects of the invention are realized by the measures taken according to the invention which characterized in that the separate composition components, i.e., the ABS graft copolymer, the second copolymer, and the additieves mixture are separately prepared and granulated, and then mixed together only at the feed to the molding equipment, and wherein the ratio of the average particle size by weight of the granular copolymer II to the average particle size by weight of the granular graft copolymer I exceeds 1.5. The resulting blended polymer composition may then be homogenized and, with melting, be extruded or injection molded into an object or article.

Advantageously said particle ratio is at least 2, and conveniently as high as 10.

Usually the average particle size ratio does not exceed 75 because above this value there may be a risk of segregation of the mixture.

In this connection, it is observed that all particle size distributions or averages given herein, are by weight.

In one preferred embodiment, said granular polymer composition I is obtained by mixing at least two separate granulated components chosen from different groups of A. a first granular polymer having an average particle size of between 60 and 250 $\mu$m;

B. a second granular polymer having an average particle size of between 200 and 500 $\mu$m and C. a third granular polymer having an average particle size in excess of 1000 $\mu$m.

Surprisingly it has been found that, in applying the process according to the invention, it is possible to prepare objects, such as pipe or automotive parts, directly from these separately granulated constituents of the overall polymer composition.

In another preferred embodiment of the process according to the invention, a mixture is used containing at least 50 wt.% graft copolymer I having an average particle size of between 75 and 200 μm, and at most 50 wt.% of granular copolymer II having an average particle size of between 200 and 450 μm, and with the particle size ratio from 1.5 to 6. More specifically at least 10 wt.% of said copolymer II is present.

In another preferred embodiment, a quantity of a third granular polymer having an average particle size of over 1000 μm is included in an amount of at least 2.5 wt.%. This latter large particle polymer can advantageously be made up as a masterbatch with one or more additives or pigments in a polymer.

Usually the average particle size of the large particle granular polymer does not exceed 5000 μm. A preferred range is from 2000 to 4000 μm.

The portion of granular polymer, having an average particle size of between 60 and 250 μm, is advantageously not less than 10 wt.% in the overall composition.

The respective granulated constituents of the polymer composition can be fed to the extruder or injection molding equipment in the form of a 'premix' blend or via separate feed streams.

Usually the feed to the extruder or the injection molding equipment is provided with a hopper optionally containing a crammer-feeder. Consequently it is possible to feed the instant polymer composition as a premix of all separately granulated constituents to said hopper. This premix can be prepared in the usual way by blending together such constituents.

If such a premix blend is used, it is advantageously prepared immediately prior to said feeding to the hopper.

Alternatively, is also possible to feed all constituents separately to the hopper. In that case, where there are two or more feed streams into the hopper, the feed streams are then mixed by homogenizing the same in the extruder or injection-molding equipment.

If at least two separate feed streams are introduced into the hopper and extruder or into the injection molding equipment it is also possible that one or more of the said streams may in fact be a premix of two or more of the separate constituents. For example, in a preferred embodiment the large particle granular polymer having an average particle size of over 1000 μm may be formulated as a masterbatch of one or more additives, optionally including pigments.

It is also possible to feed a premix of said masterbatch with one or more of the other polymer components having a smaller average particle size, for example the component with an average particle size in the region of 60 to 250 μm and/or that with a particle size in the region of 200 to 500 μm.

The blended granulated mixture is preferably prepared immediately before the melting and homogenizing, because otherwise there will be a risk of the mixture clogging the feed. This mixing can be performed in a Henschel (RTM)-type mixer, or it can be done in the hopper over the feed opening of the extruder or injection molding equipment.

In another preferred embodiment of the process according to the invention, the polymer composition fed to the extruder consists of a powder of the graft copolymer and of beads of the copolymer, optionally containing a minor quantity of the above-described masterbatch.

Of course if separate feed streams are fed to the extruder or hopper, the particle size distribution is calculated as if all components were mixed before feeding.

The process according to the invention is suitable for use in any kind of extruder or injection molding equipment, such as single-screw-extruders, cascade extruders, double-screw-extruders and all kinds of injection molding machines.

In the case of double-screw-extruder, the main advantage of the invention lies in the increased throughput permitted by this polymer composition, whereas in the other cases also the improvement in flow properties is very important.

In this connection it can be observed, that the use of a crammer feeder in the hopper to increase the quantity of polymer introduced into the melting zone of the extruder or injection moulding equipment is not necessary. However in some cases, especially if the flow properties of the product are very bad, a crammer feeder may be useful.

The exact quantities of the components, i.e. graft copolymer, copolymer and additives to be used vary according to the required properties of the object.

The overall polymer composition comprises 10–98 parts by weight of the graft copolymer I, 2–90 parts by weight of the copolymer II and 0–20 parts by weight of one or more additives III.

The graft copolymer itself is prepared by polymerizing the unsaturated nitrile/vinylaromatic monomer mixture in the presence of a rubber. The monomer mixture usually comprises one or more of the following components: styrene and/or derivatives of styrene, such as halogenated styrenes, and α-methylstyrene; acrylonitrile and/or methacrylonitrile; acrylates such as ethylacrylate, methylacrylate and methylmethacrylate; maleic anhydride.

As the rubber the rubbers generally suitable for the production of ABS can be used. Typical examples of these rubbers include polybutadiene, butadiene-styrene rubber, butadiene-acrylonitrile rubber, acrylate rubber, ethylene-propylene or ethylene-propylene-diene rubber, ethylene-vinylacetate, and chloroprene rubber.

The graft copolymer can be prepared by the usual batch, semicontinuous or continuous polymerization techniques, such as emulsion, suspension, bulk, or solution polymerization. A combination of these techniques can also be used.

The copolymer can be prepared from the same monomer mixture as used in the graft copolymer. However, this is not necessary. Usually the monomers used for preparing the copolymer are chosen from the group used also for preparing the graft copolymer. The copolymer can be prepared using any of the conventional techniques referred to above.

The polymer composition may also contain up to 5 wt.% the usual additives. These additives include antioxidants such as a phenolic or a phosphite type, UV-stabilisers such as triazine compounds and di-stearylthio-di-propionate, lubricants such as copolymers of ethyl acrylate and methylmethacrylate and ethylene bistearylamide, fillers such as titanium oxide and carbon black, antistatics such as polypropylene oxide polymer, flame retardants such as zinc-titaniumoxide and antimoxy trioxide, foaming agents such as halogenated hydrocarbons and the like.

It is also possible to incorporate a minor quantity e.g. up to 50 wt.% of one or more other polymers, such as polyvinylchloride, polyphenyloxide or polycarbonate, in the polymer composition.

The particle size of the granular polymer employed depends on the type of process to be used. With an emulsion polymerization process, the average particle size will be about 60 to 400 μm, and with a suspension polymerization process, the average particle size will be between 200 and 800 μm. If a granulate is used, the average particle size may range between 1000 and 6000 μm. When necessary to obtain the required average particle size, it is possible to reduce the particle size by crushing or grinding.

The process according to this invention can be used for the production of all kinds of objects and articles including pipes, tubing, plates, and profile forms. These objects or articles are in principle produced by extrusion or co-extrusion. It is also possible to produce foamed objects in this way.

Furthermore, extrusion or injection blow molding techniques can be applied to prepare plastic shaped objects.

Finally, it is possible to produce objects or articles by injection-molding techniques.

The invention is hereinafter further illustrated by the following examples.

EXAMPLE I

The flow properties of the following product mixtures were determined by measuring the time required for a fixed quantity of product introduced into a funnel to leave this funnel.

The following materials were tested:

A: An emulsion graft copolymer obtained by polymerizing 70 parts by weight styrene and 30 parts by weight acrylonitrile on 35 parts by weight polybutadiene, having an average particle size of approx 160 μm.

B: A suspension copolymer of 70 parts by weight styrene and 30 parts by weight acrylonitrile having an average particle size of approx. 400 μm.

C: A mixture of 70 parts by weight of A and 30 parts by weight of B. The results are given in the table.

Using the same products the same experiments were performed after mixing of the products with the usual additives, composed of 0.3 parts by weight 1,1-bis-(5-tert.butyl-4-hydroxy-2-methylfenyl)butaan, 0.3 parts by weight di-stearylthio-di-propionaat and 0.3 parts by weight difenylisooctylphosphite, and 0.6 parts by weight of a lubricant.

The results are given in the Table.

The dry flow is measured by indicating the time that is required for 300 grams to flow through a funnel having an 25 mm diameter opening, and an internal funnel angle of 30°.

TABLE

| product | without additives dry flow (sec) | with additives dry flow (sec) |
|---|---|---|
| A | 26 | 16 |
| B | 2.5 | 2.5 |
| C | 16 | 10.5 |

From this table it will be seen that the flow time for mixture C according to this invention is some 12 to 15% less than would be predicted from the component flow times, indicating synergistic effect in the flow properties.

When fed to a hopper of a pipe extrusion line, the graft copolymer A would not be processed to pipe due to feeding problems, whereas the blended mixture C could be processed at a high throughput rate without any problems.

EXAMPLE II

A mixture of 96 parts by weight of an ABS-powder having an average particle size of approx 120 μm and 4 parts by weight of a carbon black/additives masterbatch in a styrene-acrylonitrile copolymer, having an average particle size of 3000 μm was fed to a modified injection molding machine.

The flow properties of the basic ABS powder were not very good (dry flow ••40 sec), but there were no problems with the feeding of the machine. The objects could be produced at high speed. These objects had a homogeneous distribution of carbon black so that no segregation of powder and granulate had occurred.

We claim:

1. A process for the production of a molded or extruded object from a combined granular composition containing ABS polymer, said composition comprising a mixture of I from 10 to 98 parts by weight of at least one granular graft copolymer II obtained by polymerizing a mixture of one or more unsaturated nitriles and one or more vinylaromatic compounds in the presence of a rubber selected from the group consisting of polybutadiene, butadiene-styrene rubber, butadiene-acrylonitrile rubber, acrylate rubber, ethylene-propylene or ethylene-propylene-diene rubber, ethylene-vinylacetate, and chloroprene rubber, II from 2 to 90 parts by weight of a granular copolymer II of at least one unsaturated nitrile and one or more vinylaromatic compounds, and III from 0 to 20 parts by weight of at least one granular additive selected from the group consisting of antioxidants, UV-stabilizers, lubricants, fillers, antistatics, flame retardants, and foaming agents, wherein the ratio of the average particle size by weight of the granular copolymer II to the average particle size by weight of the granular graft copolymer I exceeds 1.5, and wherein the polymer composition is melted, homogenized and extruded or injection molded into an object.

2. Process according to claim 1, wherein said ratio exceeds 2.

3. Process according to claim 1, wherein said granular graft copolymer I has an average particle size range within one of the following:

A between 60 and 250 μm;
   B between 200 and 500 μm; or
   C in excess of 1000 μm;

and said granular copolymer II falls into one of the above particle size ranges other than that of graft copolymer I, while maintaining said ratio.

4. Process according to claim 3, wherein a combined composition is used containing at least 50 wt.% of said granular graft copolymer I having an average particle size of between 75 and 200 μm, and containing at most 50 wt.% of said granular copolymer II having an average particle size of between 200 and 450 μm.

* * * * *